May 21, 1968  I. A. SPEELMAN  3,384,076

OTOSCOPE HEAD

Filed Nov. 14, 1966  2 Sheets-Sheet 1

INVENTOR.
IRVING A. SPEELMAN
BY
Blum, Moscovitz, Friedman, Blum & Kaplan
ATTORNEYS

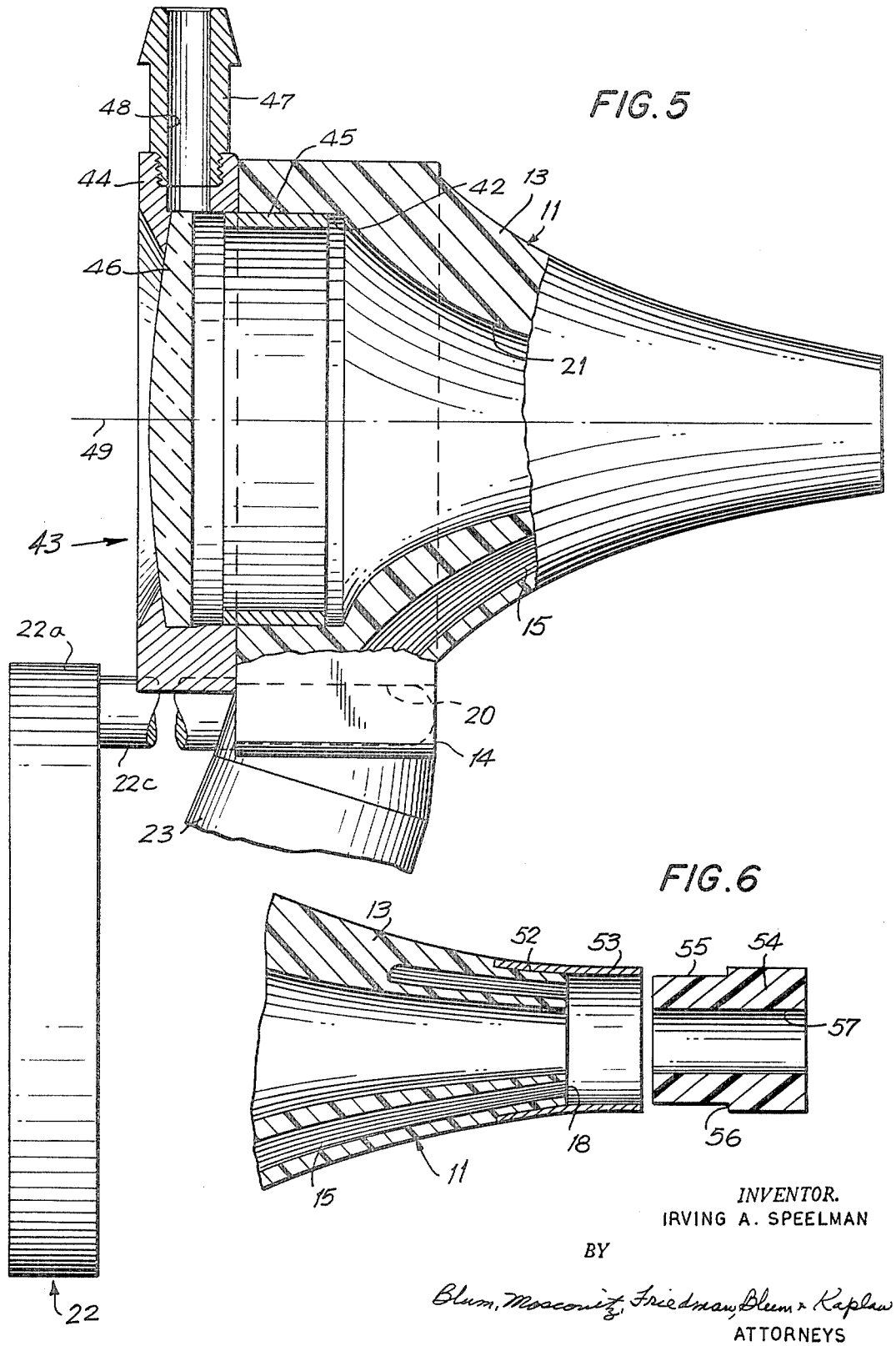

United States Patent Office 3,384,076
Patented May 21, 1968

3,384,076
OTOSCOPE HEAD
Irving A. Speelman, Roslyn Heights, N.Y., assignor to Propper Manufacturing Co., Inc., Long Island City, N.Y., a corporation of New York
Filed Nov. 14, 1966, Ser. No. 594,016
10 Claims. (Cl. 128—9)

ABSTRACT OF THE DISCLOSURE

An improved otoscope of the fibre optics type wherein a single otoscope head may be used as both an open type otoscope and a closed type otoscope by the mere changing or orientation of magnifying elements. Various advantageous features are embodied in the improved otoscope head including protection for the exposed ends of the fibres, easy interchangeability of illumination bulbs and an improved speculum which may, if desired, be used to transmit light.

---

This invention relates generally to a medical diagnostic instrument generally known as an otoscope and more particularly to an improved otoscope head. Such instruments have an illuminating head mounted on a battery handle which provides power for a light source mounted in the head to illuminate the area being observed by the physician. Such instruments are used to examine a patient's ear, for example, and thus include a sight passage surrounded by a ring of light whereby the physician is able to see into the ear while illuminating same.

Prior art devices of this general type utilize optical fibres molded in situ in the illuminating head with a bulb disposed opposite an end of the group of fibres with light being transmitted along the fibres which terminate at an illuminating ring. In prior art devices it has been common to locate the bulb in spaced relation with the ends of the fibres in an open area whereby the light may radiate in many directions resulting in a lower power of light energy transfer to and through the fibres. In such prior art devices, it has also been somewhat difficult to change the bulb (light source) in the event of a burn out. Prior otoscope heads have generally been of two types. In the open type, the magnifying lens is spaced from the rear end of the cone shaped portion containing the sight passage so that the physician can insert instruments through the sight passage and operate on the inside of the ear, for example, while concurrently observing the area on which he is operating. The closed type has the magnifying lens placed directly over the rear end of the cone shaped portion with means communicating through the sight passage whereby the head may be used to insufflate an area while concurrently observing and examining same. Since the use and function of the open and closed type heads was mutually exclusive, it was usually necessary for the physician to purchase both types of heads. Prior otoscope heads using optical fibres for light transmission have also had the drawback that the ends of the fibres have been exposed and thus subject to damage and accumulation of dirt which can reduce the effectiveness and usefulness of the otoscope.

Accordingly, it is an object of this invention to provide an otoscope head of improved construction whereby a single head can be made selectively opened or closed.

Another object of this invention is to provide an improved otoscope head which makes maximum utilization of the light source.

A further object of the invention is to provide a fibre optics otoscope head whereby the ends of the fibres are protected at all times.

Still another object of the invention is to provide improved means for mounting a bulb in an otoscope head.

A still further object of the invention is to provide an improved speculum for an otoscope head which will aid in transferring light to the area to be examined and will also be of the throw away type whereby pre-sterilization is possible.

Still other objects and advantages of the invention will in part be obvious and will in part be apparent from the specification.

Generally speaking, in accordance with the invention, an otoscope head having light transmitting fibres with one set of ends encircling the proximal end of the head has the other set of ends substantially removed from the distal end of the head to prevent interference therewith with magnifying elements for both open and closed type of heads being capable of being mounted at the distal end of the head. A chamber is provided for receiving a light bulb with the last-mentioned group of fibre ends being received adjacent to or within the chamber whereby the entire light emitted by the bulb is transmitted along the fibres and whereby the bulb may be quickly and easily changed. If desired, the proximal end of the head may extend outwardly beyond the ends of the fibres for protection of same and to receive a speculum which may be pre-sterilized and which may aid in transmittal of light and which may be discarded after use.

The invention accordingly comprises the features of constructions, combinations of elements, and arrangement of parts which will be exemplified in the constructions hereinafter set forth, and the scope of the invention will be indicated in the claims.

For a fuller understanding of the invention, reference is had to the following description taken in connection with the accompanying drawings, in which:

FIG. 5 is a partial view similar to FIG. 2 but showing the head arranged for use as a closed type head; and FIG. 6 is a partial view of the proximal end of a modified head construction with a removable speculum being shown in exploded view.

Figure 1:
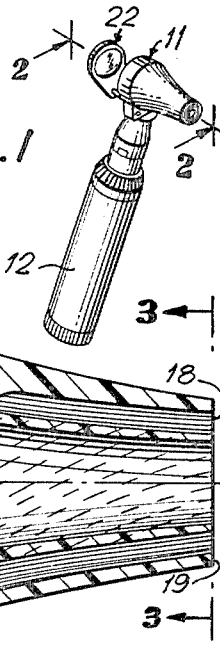
FIG. 1 is a perspective view of an otoscope showing a head mounted to the battery handle.

Referring to FIG. 1, the medical diagnostic instrument or otoscope consists of a head 11 and battery handle 12 to which the head is removably mounted. The battery handle carries batteries, which may be of the rechargeable type, and a switch for illuminating the removeable head in which the bulb is carried. Since the battery handle forms no part of the instant invention, a detailed description thereof is deemed unnecessary.

Figure 2:
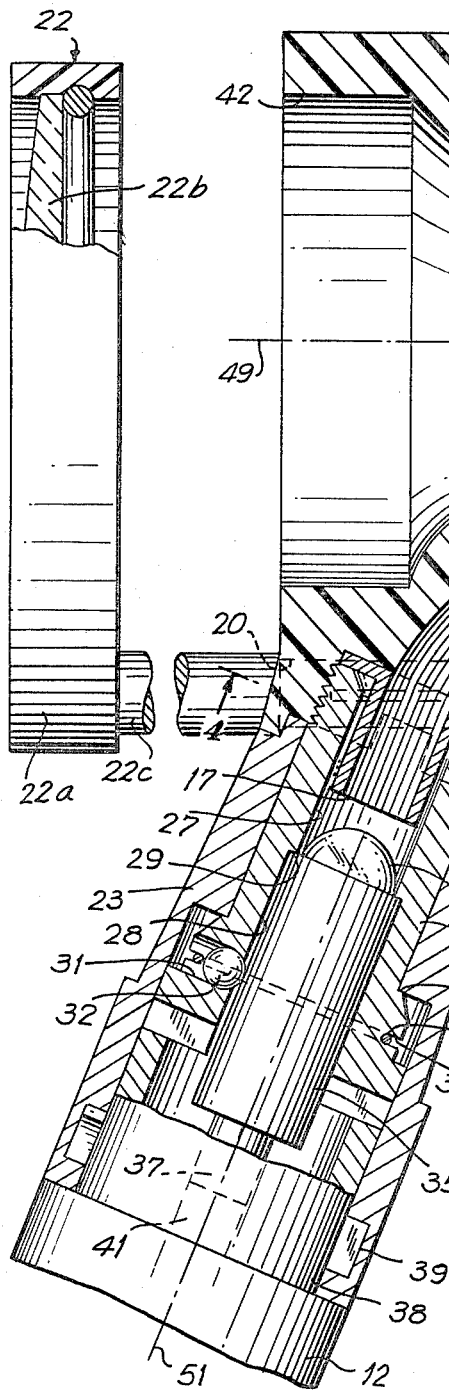
FIG. 2 is a partial sectional view, at an enlarged scale, taken along line 2—2 of FIG. 1.
Figure 3:
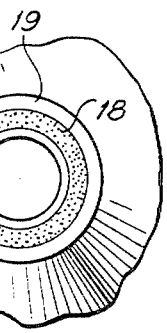
FIG. 3 is a partial end elevational view looking in the direction of arrows 3—3 of FIG. 2.
Figure 4:
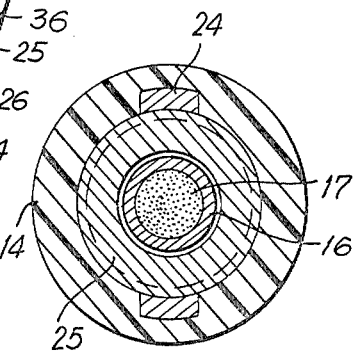
FIG. 4 is a sectional view taken along line 4—4 of FIG. 2.

Referring to FIGS. 2 through 4, head 11 is generally molded of plastic material with a cone shaped portion 13 and a base portion 14. A plurality of light transmitting fibres 15 are molded in situ within the head. At one end, the fibres are received in a bushing 16 also molded in situ with the ends being identified as 17. The opposite ends 18 of the fibres are spaced about the periphery of the proximal end 19 of the head in a circular pattern as best seen in FIG. 3. Ends 18 are exposed as are ends 17 and the remaining portions of the fibres are molded wholly within the plastic head material.

The head is provided with a cone shaped aperture 21 through which the physician may look with a magnifying element 22 provided at the distal end for magnifying the image observed. Magnifying element 22 consists of a support 22a and a lens 22b. A post 22c supports the magnifying element and is rotatably and removeably mounted in a suitable hole 20 in the base portion of the head. With the magnifying element spaced from the distal end of the head, an open type otoscope is thereby provided.

The head utilizes the principle of fibre optics to transmit light along the longitudinal axes of the fibres from ends 17 to ends 18 whereby an area in proximity to ends 18 may be illuminated during visual observation of the area through cone shaped aperture 21.

A metallic or electrically conducting collar 23 having guiding lugs 24 is mounted to the end of base portion 14 surrounding ends 17. A metallic or electrically conductive sleeve 25 is mounted within collar 23 and threadedly engages base portion 14 to hold the elements in assembled position through mating shoulders 26.

Sleeve 25 has cylindrical coaxial passages 27 and 28 meeting at a shoulder 29. A radial aperture 31 communicates with passage 28 and has a ball 32 slideably mounted therein. The diameter of radial aperture 31 at the surface of passage 28 is smaller than the diameter of ball 32 to limit the travel of the ball into the passage while permitting partial projection thereinto to provide detent pressure for a purpose to be hereafter described. An undercut 33 peripherally surrounds the sleeve and passes through the longitudinal axis of aperture 31. A spring ring 34 is received in the undercut and acts against ball 32 to bias the ball into passage 28.

A light bulb 35 has the body thereof closely received in passage 28 with the upper end thereof abutting shoulder 29. The illuminating end 36 projects into passage 27. The central contact end 37 extends oppositely from the illuminating end.

Battery handle 12 includes a mounting collar 38 having ears 39 adapted to mate with appropriate cut outs in collar 23 whereby the head may be removeably mounted to the battery handle. The battery handle includes a contact 41 which makes contact with the end of bulb 35, this contact constituting one pole of the battery with collar 38 constituting the other pole of the battery through collar 23, sleeve 25 and the outside surface of bulb 35.

When the battery handle is switched on by means of any suitable switch (not shown) bulb 35 is illuminated with the light eminating from illuminating end 36. It is apparent from FIG. 2 that the illuminating end is completely enclosed within passage 27 whereby a chamber is formed with the only exit for light energy being through the ends 17 of the fibres 15. Thus substantially all the light energy is caused to travel through the fibres and to form a ring of light at ends 18 as seen in FIG. 3. By holding the head close to an area to be examined, the area is illuminated by the light ring at proximal ends 18 and the area observed by the examining physician through aperture 21. The location of fibre ends 17 within the chamber also protect them from damage and dirt.

When the head is removed from the battery handle, the central contact end 37 is exposed and this end, which is, as shown in FIG. 2, substantially smaller than the internal diameter of collar 23 at the lower end thereof, may be readily gripped for easy withdrawal of the bulb and replacement of another bulb, when necessary. The bulb is held in place to prevent accidental or inadvertent withdrawal thereof by the detent pressure applied by ball 32 acted on by spring ring 34.

Referring now to FIG. 5, the cone shaped aperture 21 terminates, at the distal end, in a cylindrical opening 42 which supports a magnifying element 43. Magnifying element 43 consists of a circular support 44 having a cylindrical shoulder 45 adapted to be received in cylindrical opening 42 to removeably support the magnifying element in the head. A lens 46 is supported by the circular support 44. A tube 47 extends from the circular support and has a passage 48 which communicates with the interior of aperture 21. Magnifying element 43 chooses the end of head 11 and thus provides a closed type otoscope with insufflation capable of taking place through passage 48. As shown in FIG. 5, magnifying element 22 may be rotated out of the sight axis 49 or may be completely removed when the head is used with the magnifying element 43. The location of base portion 14 (FIG. 2) and the bending the fibres 15 away from the sight axis permits the utilization of the head with either of the magnifying elements so that a single head may become either a closed or open type otoscope, thus eliminating the necessity of purchasing separate heads for these two functions. The ends 17 of the fibres terminate in the above-described chamber which lies on an axis 51 which is located at a substantial angle to sight axis 49. The angle is an acute angle of at least 45° to position the fibres away from the distal end so that the fibres do not interfere with mounting of magnifying element 43. In the preferred embodiment disclosed, the angle is approximately 72° to provide optimum tilt to the head during use. The disposition of axis 51 at an acute angle with respect to the sight axis 49 of at least 45°, is critical in order for the head to be used with either of the magnifying elements shown whereby a single head may be selectively of the open or closed type.

Turning now to FIG. 6, the proximal end of head 11 may be provided with an undercut 52 on which is mounted a collar 53 which extends beyond ends 18 of the fibres to thereby protect the ends of the fibres from damage and the accumulation of dirt. In order for the fibres to properly transmit light, they must have an optically flat finish and thus damage thereto can greatly impair the light transmission of same. Collar 53 is secured by any simple means, such as an adhesive, to the proximal end of the head. A speculum may also be provided for mounting to the head. In the embodiment of FIG. 6, speculum 54 is provided with an under cut 55, a shoulder 56 and a sight passage 57. The speculum may be molded of any suitable clear plastic material which may be light transmitting such as that sold under the trademark Lucite whereby the light transmitted at the proximal ends of the fibres will be transmitted through the speculum. The speculum disclosed is inserted into collar 53 and suitably releasably retained therein, such as by a friction fit, with sight passage 57 being on an axis coincident with sight axis 49. The sight passage would be a continuation of the sight passage of the head. If desired, the walls of speculum 54 may be relatively thick so that light transmitted from the ends 18 of the fibres is also transmitted through the speculum. On the other hand, the walls can be such that the ends 18 of the fibres are only partially covered or completely uncovered by the speculum and thus light transmitted through the speculum is optional and selective. The speculum may be pre-sterilized and discarded after each use thereby making it possible to have pre-sterilized ends on the otoscope head.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:

1. A diagnostic instrument comprising a handle having a head supporting end, electric power means carried by said handle, electrical connecting means carried by said handle at said head supporting end, and head mounting means at said head supporting end, said head comprising a body having a mounting portion removably connecting said head to said handle through said head mounting means, a viewing opening defining a sight axis, and light transmitting fibers within said body and extending from said mounting portion to adjacent one end of said viewing opening, said body mounting portion including a conductive sleeve forming a through passage having an end for receiving an illuminating device and an opposite end, said fibers being packed in close proximity, one to another, at one end thereof and terminating at said one end to define the inner end of a closed passageway at said opposite end, and an illuminating device removably mounted in said conductive sleeve and having a conductive body portion in contact with said conductive sleeve, an illuminating end, and a contact end, said illuminating end being located wholly within said closed passageway adjacent the inner end of said closed passageway defined by said one end of said fibers, said contact end being exposed when said head is removed from said body, said contact end and said conductive sleeve being connected to said electrical connecting means carried by said handle when said head is mounted on said handle at said head supporting end, said contact end of said illuminating device being spaced from said conductive sleeve, whereby said illuminating device may be gripped and removed from said conductive sleeve when said head is dismounted from said handle and whereby said illuminating device and said conductive sleeve are connected to said electrical connecting means when said head is mounted on said handle.

2. A diagnostic instrument as claimed in claim 1 wherein said one end of said fibers, said passageway and said illuminating device define a chamber within said body from which light energy cannot escape, except through said fibers, the cross-sectional dimension of said chamber being substantially the cross-sectional dimension of said conductive body portion of said illuminating device.

3. A diagnostic instrument as claimed in claim 1 wherein said passage in said sleeve comprises a pair of coaxial passages of different cross-sectional sizes and a shoulder joining same, said illuminating device having a body portion received in, substantially filling and following the contour of the larger of said passages, said shoulder providing a stop to limit insertion of said illuminating device into the smaller of said passages, the illuminating end of said illuminating device being disposed at one end of said smaller passage adjacent said shoulder and said fibres being disposed at the opposite end of said smaller passage.

4. A diagnostic instrument as claimed in claim 3 and including detent means disposed partially within said larger passage for releasably retaining said illuminating device therein.

5. A diagnostic instrument as claimed in claim 4 wherein said detent means includes a detent element slideably received in said sleeve and projecting partially into said larger passage, means to limit the projection of said detent element into said passage and spring means acting on said detent element to bias same toward said larger passage.

6. A diagnostic instrument as claimed in claim 1 wherein the longitudinal axis of the fibres at least at said one end extend, with respect to said sight axis, at an acute angle at least as great as 45°.

7. A diagnostic instrument as claimed in claim 1 wherein said body has a proximal end and a distal end and including a first magnifying element removeably mounted to said body directly over and closing said viewing aperture at said distal end and a second magnifying element mounted to said body in spaced relation to the distal end thereof.

8. A head for a diagnostic instrument comprising a body having proximal and distal ends, a viewing opening through said body along a sight axis, light transmitting fibers located within said body, said fibers at one end thereof terminating in an annulus surrounding said viewing opening at said proximal end, a collar fixedly mounted to said body at least at said proximal end, said collar surrounding the annulus of said fibers and extending beyond the ends thereof along said sight axis, and a clear plastic speculum mounted on said head and having a sight passage coincident with said sight axis.

9. A head for a diagnostic instrument as claimed in claim 8 wherein said clear plastic speculum is substantially cylindrical and removeably mounted proximate the annulus of said fibres, said speculum including means cooperating with said collar for removably supporting said speculum in said collar.

10. A head for a diagnostic instrument as claimed in claim 9 wherein at least a portion of the walls of said clear plastic speculum extend over at least a portion of said fibres at said one end whereby at least a portion of the light transmitted through said fibres is transmitted through said clear plastic speculum.

References Cited

UNITED STATES PATENTS

| | | | |
|---|---|---|---|
| 1,849,701 | 3/1932 | Allyn | 128—6 |
| 2,039,546 | 5/1936 | McGerry | 128—9 |
| 2,678,041 | 5/1954 | Thorburn et al. | 128—6 |
| 2,746,450 | 5/1956 | Lady et al. | 128—6 |
| 2,797,684 | 7/1957 | Moore | 128—9 |
| 3,146,775 | 9/1964 | Moore et al. | 128—6 |
| 3,261,349 | 7/1966 | Wallace | 128—6 |
| 3,299,884 | 1/1967 | Moore et al. | 128—23 |

RICHARD A. GAUDET, *Primary Examiner.*

K. L. HOWELL, *Assistant Examiner.*